C. H. SAWYER & J. BOWDITCH.
LIMBER PIN FOR MINE SKIPS.
APPLICATION FILED SEPT. 13, 1913.

1,092,750.

Patented Apr. 7, 1914.
2 SHEETS—SHEET 1.

WITNESSES

INVENTORS
Charles Henry Sawyer
James Bowditch.
BY
ATTORNEYS

C. H. SAWYER & J. BOWDITCH.
LIMBER PIN FOR MINE SKIPS.
APPLICATION FILED SEPT. 13, 1913.

1,092,750.

Patented Apr. 7, 1914.
2 SHEETS—SHEET 2.

WITNESSES
W. E. Baker Jr.
Geo. H. Beeler

INVENTORS
Charles Henry Sawyer
James Bowditch
BY
ATTORNEYS

COLUMBIA PLANOGRAPH CO., WASHINGTON, D. C.

UNITED STATES PATENT OFFICE.

CHARLES HENRY SAWYER AND JAMES BOWDITCH, OF NEWCASTLE, NEW SOUTH WALES, AUSTRALIA.

LIMBER-PIN FOR MINE-SKIPS.

1,092,750. Specification of Letters Patent. Patented Apr. 7, 1914.

Application filed September 13, 1913. Serial No. 789,715.

*To all whom it may concern:*

Be it known that we, CHARLES HENRY SAWYER, a subject of the King of Great Britain and Ireland, residing at Berner street, Merewether, Newcastle, in the State of New South Wales, Commonwealth of Australia, and JAMES BOWDITCH, a subject of the King of Great Britain and Ireland, residing at Maitland Road, Islington, Newcastle, in the State of New South Wales, Commonwealth of Australia, have invented certain new and useful Improvements in Limber-Pins for Mine-Skips, of which the following is a specification.

The present invention relates to devices for coupling a mine skip or like vehicle to animal draft gear and has been designed to provide for that purpose an improved limber pin of simple and strong construction adapted to effect such engagement with the draw bar hook of said vehicle that the same may not become detached and withdrawn during progress of the vehicle but further may be manually disengaged with facility. And according to the present invention an improved limber pin for mine skips and like vehicles consists essentially of a pin member the lower end of which is adapted to pass vertically through the eye of the vehicle draw-bar or its equivalent and be retained in position by a gravity or spring held locking-member or pair of opposing locking-members pivotally secured to or in the top end or head of said pin which head is further provided with a projecting arm for attachment to the animal draft gear. In the preferred construction the pin-member is cylindrical (with one end coned) to pass through the draw-bar eye while its other and top end has an arm for connection to the animal draft gear, and a gravity or spring held pivoted catch-member adapted to pass around the draw-bar eye and take thereunder. The catch-member is extended above or is offset from its pivot so that it may be manually released to permit the withdrawal of the pin-member from the draw-bar.

Figure 1:
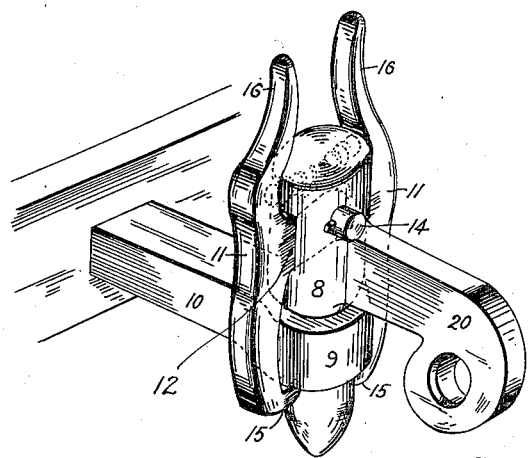
Figure 2:
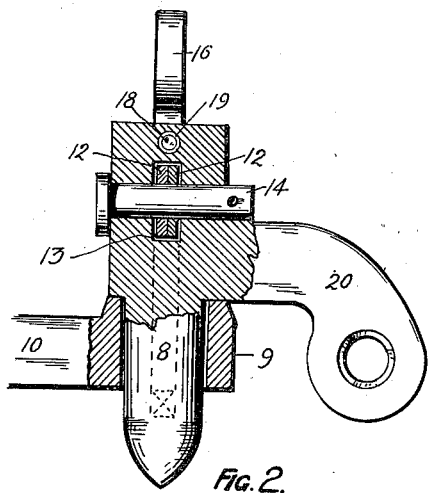
Figure 3:
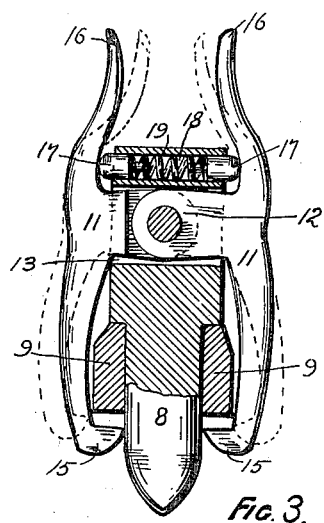
Figure 4:
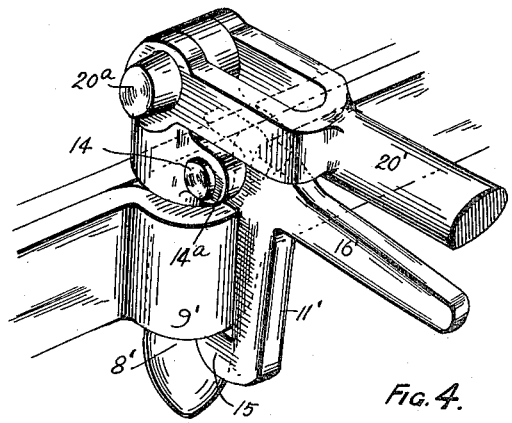
Figure 5:
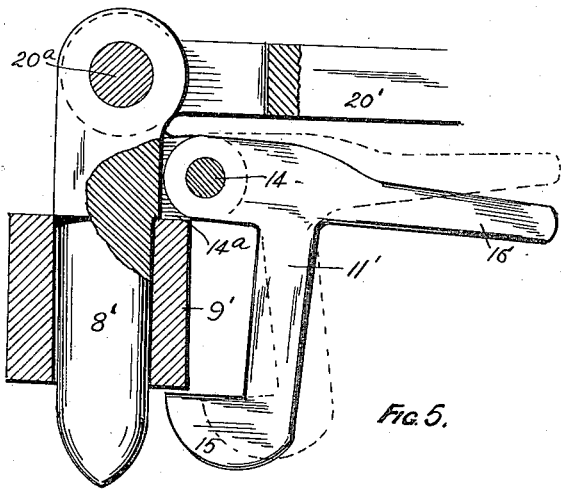

Referring now to the drawings accompanying and forming part of this complete specification and wherein is depicted improved limber-pin construction according to this invention, Figure 1 is a perspective view showing the limber-pin in engagement with the draw bar of a truck. Fig. 2 is a side elevation of Fig. 1, partly in section. Fig. 3 is a vertical section at right angles to Fig. 2. Figs. 4 and 5 depict a modified form of pin having one catch member only which is offset, Fig. 4 being a perspective view showing the limber-pin engaging an eye in a strap attached to the frame of a truck, and Fig. 5 a side elevation thereof, partly in section.

Referring particularly to Figs. 1 to 3 inclusive:—The cylindrical pin-member 8 has its lower end tapered and passes through a terminal eye 9 of the vehicle draw-bar 10, such engagement being retained by the pair of diametrically opposing locking-members 11. These locking-members 11 are each provided on the inner face with an apertured projection 12 terminally reduced and fitting within a vertical slot 13 in the enlarged top end of the pin-member 8 through which the pivot-pin 14 passes and also through said projections 12. The lower end of each of the locking members 11 is provided on the inner edge with a pointed offset 15 adapted and designed to take under the lower face of the draw-bar eye 9. To assure the retention of the offsets 15 of the locking-members 11 in the required position as stated, said members are provided with extensions 16 above the pivot-pin 14, against the inner edges of which bear the pins 17 protruding from the transverse aperture 18 in the top end of the pin-member 8 and pressed outwardly by the coil spring 19 contained in such aperture (see Fig. 3). Extending forward of the drawbar eye 9 and integral with the enlarged head of the pin-member 8 is provided the terminally eyed shank or offset extension 20 to which the animal draft gear (not shown) is attached. The parts being in the position shown in Figs. 1 to 3, when it is desired to withdraw the pin-member 8 from engagement with the eye 9 of the drawbar 10 the extensions 16 of the locking-members 11 are moved toward each other, the turning movement of said members about the pivot-pin 14 permitting the terminal offset 15 of each of said members 11 to clear the lower edges of the eye 9 of the draw-bar 10. When it is desired to insert the pin the lower ends of the members 11 are similarly moved apart if necessary but the configuration of the underside of the offsets 15 is such that ordinarily these members may be wedged apart by contacting with the outer edges of the eye 9 if downward pressure is applied to the pin 8.

Referring now to Figs. 4 and 5 in which similar reference numerals are used to indicate corresponding parts:—In the modified construction, for use where the eye 9' is located directly against the end of the skip as shown, the locking device consists of one integer, i. e. the gravity member 11', the pivot pin 14 of which passes through a lug 14ª at the top end of the pin-member 8', which lug underlies the draft-member 20' whose rearward end is bifurcated and attached to the top of said pin-member 8' by through pin 20ª. The disengagement of the limber-pin from the position shown in Figs. 4 and 5, is effected by raising the arm 16' of the locking-member 11' so that its extension 15 clears the eye 9' permitting the pin member 8' to be withdrawn from said eye; while the overhanging weight of the offset arm 16' serves to normally retain the offset 15 in the engagement position. For insertion of the pin the offset 15 is withdrawn in similar manner or it may be wedged outwardly by contact with the outer edges of the eye 9' in similar manner to that described with reference to Figs. 1 to 3.

What we claim and desire to secure by Letters Patent is:—

Improved limber-pin for mine skips or the like comprising in combination a pin member adapted to pass vertically through the eye of an element attached to a skip or the like, a retention member pivotally attached to said pin member and having an inwardly projecting offset taking under said eye and a manually operated offset to release said retention member, and means for attaching draft gear to said pin member.

Signed at Newcastle, New South Wales, this 25th day of July, A. D. 1913.

CHARLES HENRY SAWYER.
JAMES BOWDITCH.

Witnesses:
E. W. PATON,
J. M. LANGFELDT.

---

Copies of this patent may be obtained for five cents each, by addressing the "Commissioner of Patents, Washington, D. C."